United States Patent
Laine et al.

(10) Patent No.: US 11,758,841 B2
(45) Date of Patent: Sep. 19, 2023

(54) GANG-TYPE LAWN MOWER

(71) Applicant: Textron Inc., Providence, RI (US)

(72) Inventors: Michael Jonathan Laine, Graniteville, SC (US); Ashwath Thukaram Kini, Ghent (BE); Todd L. Scott, Fort Mill, SC (US); Jarrett A. Jones, Martinez, GA (US)

(73) Assignee: Textron Inc., Providence, RI (US)

( * ) Notice: Subject to any disclaimer, the term of this patent is extended or adjusted under 35 U.S.C. 154(b) by 244 days.

(21) Appl. No.: 17/105,777

(22) Filed: Nov. 27, 2020

(65) Prior Publication Data

US 2021/0076565 A1 Mar. 18, 2021

Related U.S. Application Data

(63) Continuation of application No. 16/270,117, filed on Feb. 7, 2019, now abandoned.

(51) Int. Cl.
| | |
|---|---|
| *A01D 75/20* | (2006.01) |
| *A01D 75/30* | (2006.01) |
| *A01B 73/04* | (2006.01) |
| *A01D 34/66* | (2006.01) |
| *A01D 34/82* | (2006.01) |
| *A01D 101/00* | (2006.01) |

(52) U.S. Cl.
CPC ............ *A01D 34/66* (2013.01); *A01B 73/044* (2013.01); *A01D 34/82* (2013.01); *A01D 34/828* (2013.01); *A01D 75/20* (2013.01); *A01D 75/306* (2013.01); *A01D 2101/00* (2013.01)

(58) Field of Classification Search
CPC .................. A01D 34/64; A01D 34/661; A01D 2034/645; A01D 75/30; A01D 75/303; A01D 75/306; A01D 75/20; A01B 63/104; A01B 63/106; A01B 73/044
See application file for complete search history.

(56) References Cited

U.S. PATENT DOCUMENTS

| | | | |
|---|---|---|---|
| 2,057,417 | A | 10/1936 | Clapper |
| 2,936,561 | A | 5/1960 | Grimes |
| 3,116,583 | A | 1/1964 | Mason |
| 3,339,353 | A | 9/1967 | Schreyer |
| 3,429,110 | A | 2/1969 | Strasel |

(Continued)

FOREIGN PATENT DOCUMENTS

EP 1527670 A2 * 5/2005 ............ A01D 34/863

*Primary Examiner* — Thomas B Will
*Assistant Examiner* — Madeline I Runco
(74) *Attorney, Agent, or Firm* — Sandberg Phoenix & von Gontard PC (57) ABSTRACT

A mower includes a frame, at least one cutting unit, and a lifting unit. The lifting unit is connected to the at least one cutting unit and includes a yoke assembly, a first arm assembly, a second arm assembly, and a third arm assembly. The yoke assembly is connected to the cutting unit. The first arm assembly is pivotably mounted to the vehicle frame about a first pivot axis. The second arm assembly is pivotably mounted to the first arm assembly about a second pivot axis and to the yoke assembly about a third pivot axis with the second pivot axis and third pivot axis being non-parallel to the first pivot axis. The third arm assembly includes a first end pivotally connected to the frame and a second end pivotally connected to the second arm assembly.

10 Claims, 10 Drawing Sheets

(56) References Cited

U.S. PATENT DOCUMENTS

| | | |
|---|---|---|
| 3,511,033 A | 5/1970 | Strasel |
| 3,526,083 A | 9/1970 | Barry et al. |
| 3,606,048 A | 9/1971 | Long |
| 4,769,976 A | 9/1988 | Bassett et al. |
| 4,815,259 A | 3/1989 | Scott |
| 5,069,022 A | 12/1991 | Vandermark |
| 5,280,695 A | 1/1994 | Nunes et al. |
| 5,553,445 A | 9/1996 | Lamb et al. |
| 5,775,075 A | 7/1998 | Dannar |
| 6,032,441 A | 3/2000 | Gust et al. |
| 6,042,330 A * | 3/2000 | Egan ................ B66C 23/44 414/744.5 |
| 6,047,530 A | 4/2000 | Bednar |
| 6,266,950 B1 | 7/2001 | Stace |
| 6,336,312 B1 | 1/2002 | Bednar et al. |
| 7,287,363 B2 | 10/2007 | Phillips |
| 7,305,811 B2 | 12/2007 | Murawski |
| 7,971,415 B2 | 7/2011 | Phillips |
| 8,713,904 B1 | 5/2014 | Goudy |
| 2002/0184865 A1 | 12/2002 | Short |
| 2005/0144922 A1 | 7/2005 | Hensley et al. |
| 2008/0072556 A1 | 3/2008 | Tegtmeier et al. |
| 2009/0277149 A1 | 11/2009 | Adkins |
| 2010/0176563 A1 | 7/2010 | Madler |
| 2010/0275565 A1 | 11/2010 | Moe et al. |
| 2014/0345242 A1 | 11/2014 | Carroll |
| 2017/0172054 A1* | 6/2017 | Sammut ................ A01D 75/30 |

* cited by examiner

GANG-TYPE LAWN MOWER

TECHNICAL FIELD

The invention relates generally to gang-type lawn mower and in particular to a lift geometry for one or more of the cutting units utilized in a gang-type lawn mower.

BACKGROUND

Gang-type lawn mowers are characterized by a plurality of rotary cutting decks. For example, some gang-type rotary mowers include a front row of two or more cutting decks forward of the front wheels and a rear row of two or more cutting decks located between the front wheels and the rear wheels, wherein at least a portion of the one or more cutting decks extends laterally beyond the wheels of the mower to maximize the cutting width. During transport the outer cutting decks are lifted vertically to minimize the width of the mower. It would be desirable to provide a lifting geometry that optimizes the location of the cutting deck in both the lowered position and raised position.

SUMMARY

According to one aspect, a gang-type mower includes a frame, at least one cutting unit, and a lifting unit. The lifting unit is connected to the at least one cutting unit and includes a yoke assembly, a first arm assembly, a second arm assembly, and a third arm assembly. The yoke assembly is connected to the cutting unit. The first arm assembly is pivotably mounted to the vehicle frame about a first pivot axis. The second arm assembly is pivotably mounted to the first arm assembly about a second pivot axis and to the yoke assembly about a third pivot axis with the second pivot axis and third pivot axis being non-parallel to the first pivot axis. The third arm assembly includes a first end pivotally connected to the frame and a second end pivotally connected to the second arm assembly.

According to another aspect, a lifting unit comprises a yoke assembly, a first arm assembly, a second arm assembly, and a third arm assembly. The first arm assembly includes a first end and a second end, wherein the first arm assembly includes apertures configured to pivotally affix the first arm assembly to a stationary frame about a first pivot axis. The second arm assembly includes a first end and a second end, wherein the first end is pivotably connected to the second end of the first arm assembly about a second pivot axis and wherein the second end is pivotally connected to the yoke assembly about a third pivot axis, wherein the second pivot axis and third pivot axis are non-parallel to the first pivot axis. The third arm assembly includes a first end configured to pivotally connect the third arm assembly to the stationary frame and a second end pivotally connected to the second arm assembly.

DETAILED DESCRIPTION

The present disclosure provides a gang-type lawnmower having a plurality of cutting decks. At least one of the cutting decks is connected to the frame via a lift unit that lifts the cutting deck from a first position to a second position. In particular, the lift unit moves the cutting deck both vertically (z-direction) and longitudinally (y-direction) when moving from the first position to the second position. To provide both vertical and longitudinal movement the lift unit includes a first arm assembly connected to the frame at one end and to a second arm assembly on a second end, wherein the first arm assembly pivots about a first axis located between the first end and the second end. The second arm assembly includes a first end and a second end, wherein the first end is pivotally connected to the first arm assembly and the second end is pivotally connected to a yolk assembly that in turn supports the cutting deck. A third arm assembly is connected between a fixed location (e.g., frame) and the second arm assembly. To raise the cutting deck the first arm assembly is pivoted about the first axis. As the cutting deck is raised vertically (in the z-direction), the second arm assembly is allowed to pivot at both the first and second ends to move the cutting deck longitudinally (e.g., in the y-direction or rearward) as dictated by the connection of the third arm assembly to the second arm assembly.

Figure 1:
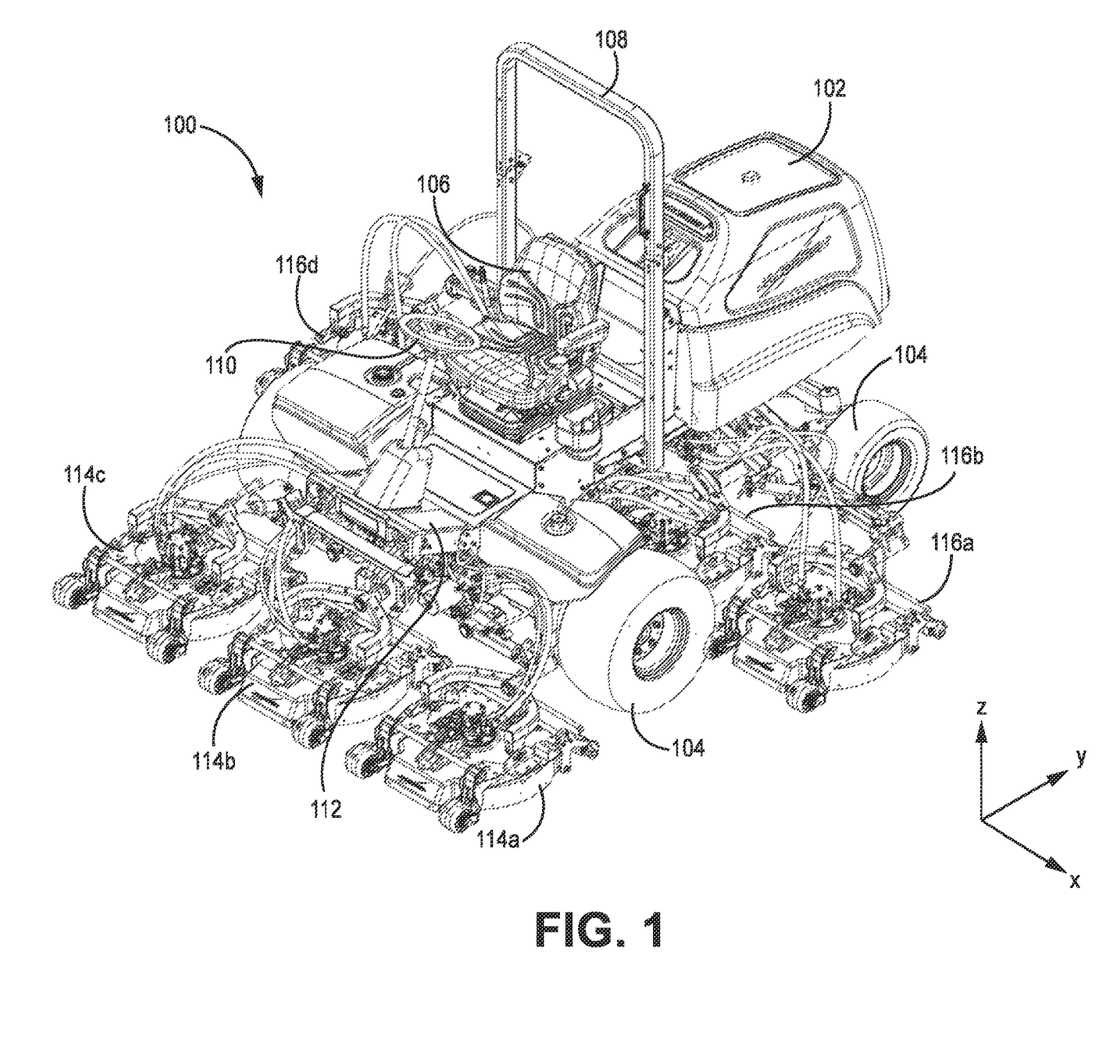
FIG. 1 is an orthogonal view of a gang-type lawn mower according to some embodiments
Figure 2A:
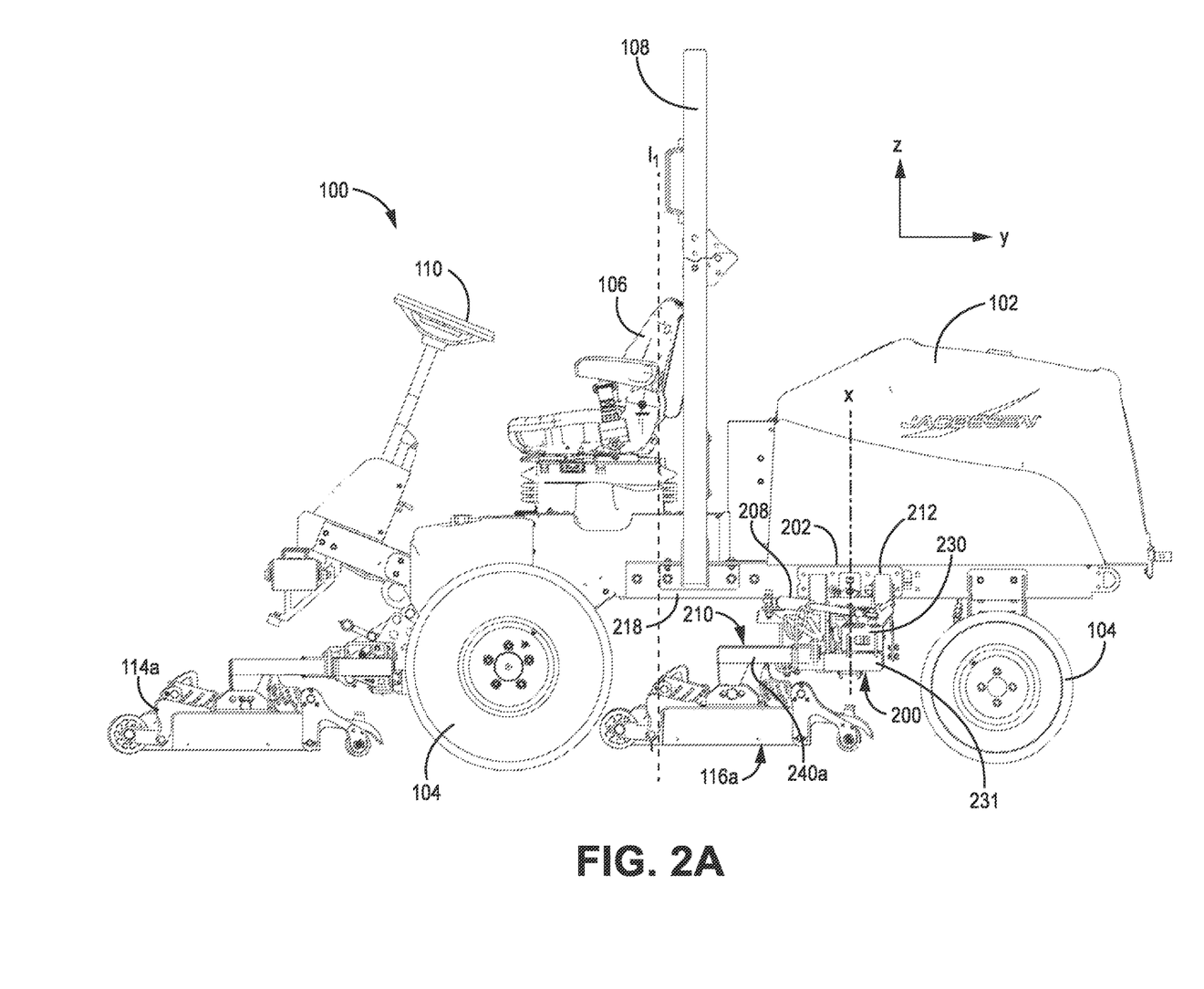
FIGS. 2A and 2B are side views of the gang-type lawn mower with the cutting decks in a lowered and raised positions, respectively, according to some embodiments.
Figure 2B:
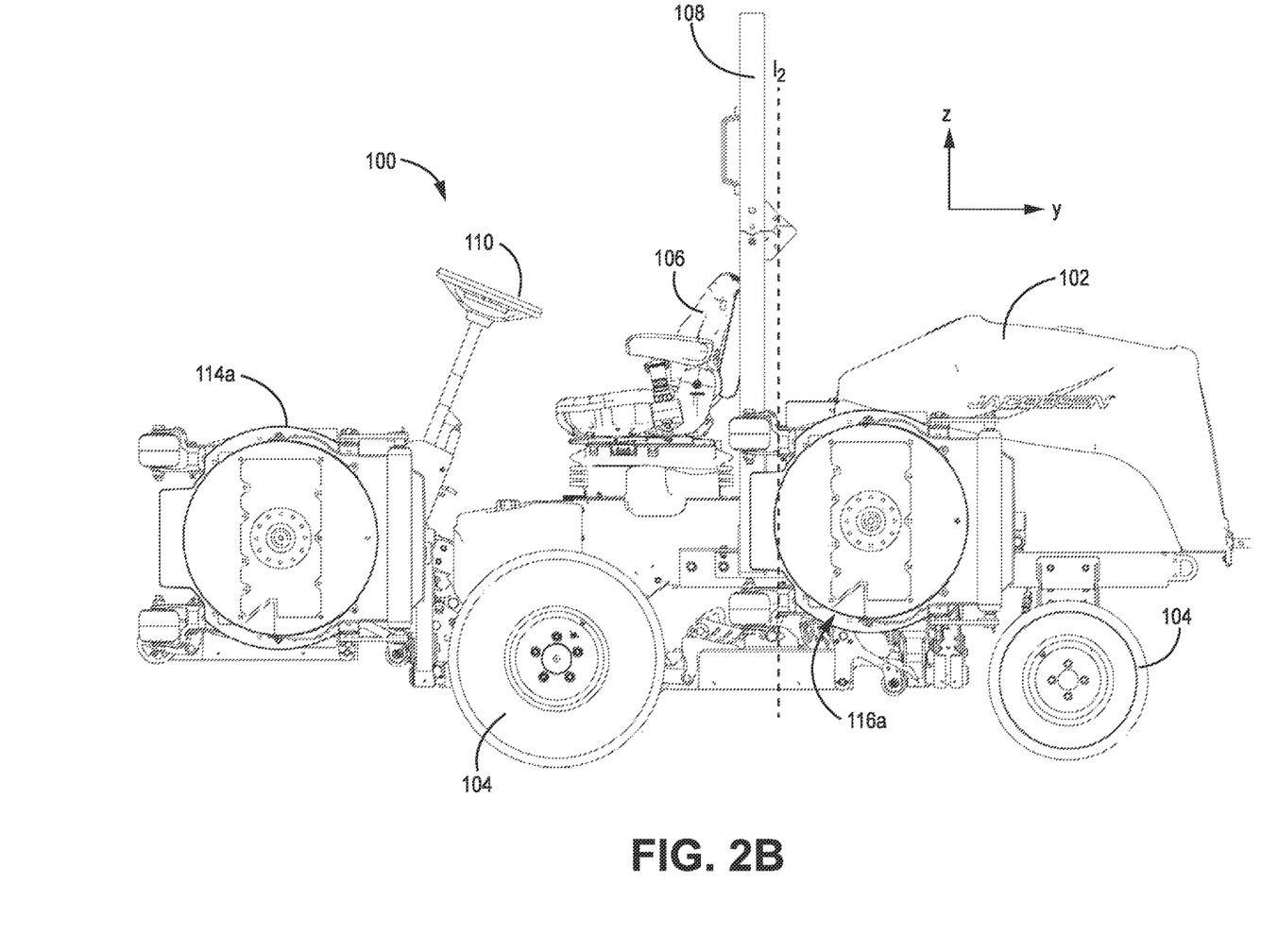

Referring now to FIGS. 1, 2A and 2B, a gang-type rotary mower 100 is shown. FIG. 2A is a side view that illustrates cutting deck 116a in the first position (i.e., lowered position) and FIG. 2B is a side view that illustrates the cutting deck 116a in the second or raised position. In some embodiments, the gang-type lawn mower 100 includes engine cover/hood 102, ground-engaging members 104, seat 106, roll-over protection bar 108, steering wheel 110, footrest 112, forward cutting decks 114a, 114b, and 114c and rear cutting decks 116a, 116b, and 116d (one of which is hidden from view). In some embodiments, the front row includes three cutting decks 114a, 114b, and 114c and the back row includes four cutting decks, wherein cutting decks 116a. 116b, and 116d are visible. In the embodiment shown in FIG. 1, each of the cutting decks 116a, 116b, and 116d is in the first position (i.e., lowered position).

As illustrated in FIGS. 2A and 2B, the cutting deck 116a moves rearward along the y-axis when raised from the first position to the second position. As shown in FIG. 2A, a forward cutting edge of cutting deck 116a is marked by dashed line 11, which is located forward of roll-over protection bar 108 and approximately equal with the operator's seat 106. In the second or raised position—shown in FIG. 2B—the forward cutting edge of cutting deck 116a is marked by dashed line 12, which is located rearward of the operator seat 106 and roll-over protection bar 108. In this way, at least a portion of the cutting deck 116a is located adjacent to the operator seat 106 in the first, lowered position and located rearward of the operator seat 106 in the second, raised position. In the embodiment shown in FIG. 2B, cutting deck 116 is located rearward of the operator seat 106 when in the raised position, and approximately adjacent to the operator seat 106 when in the first position. In some embodiments, having the cutting deck 116 move rearward when moved into the raised position allows the operator to exit the vehicle more easily. In other embodiments, the cutting deck 116a and 116d may be moved forward along the y-axis rather than rearward depending on the configuration of the vehicle.

Figure 3A:
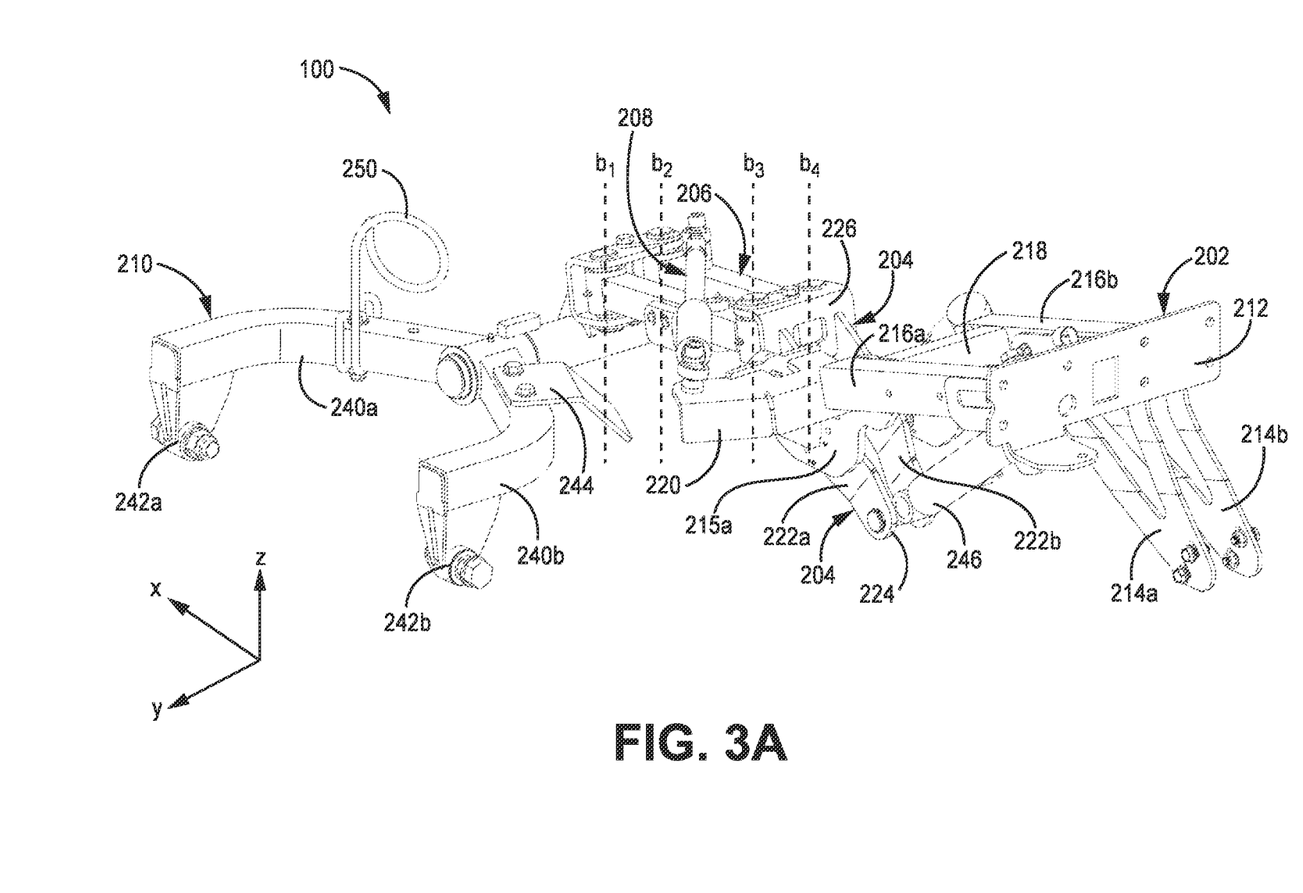
FIG. 3A is an orthogonal view of a lifting unit in the lowered position.
Figure 3B:
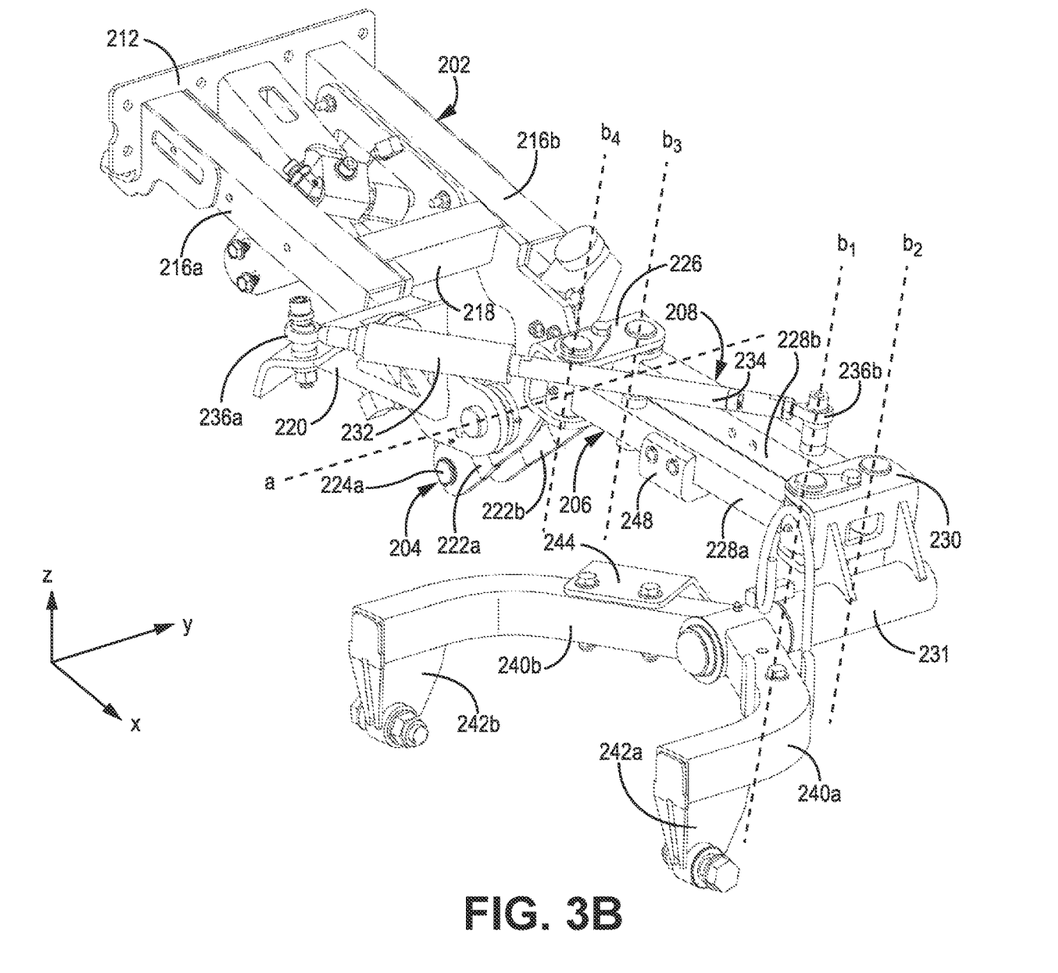
FIG. 3B is another orthogonal view of the lifting unit in the lowered position.
Figure 3C:
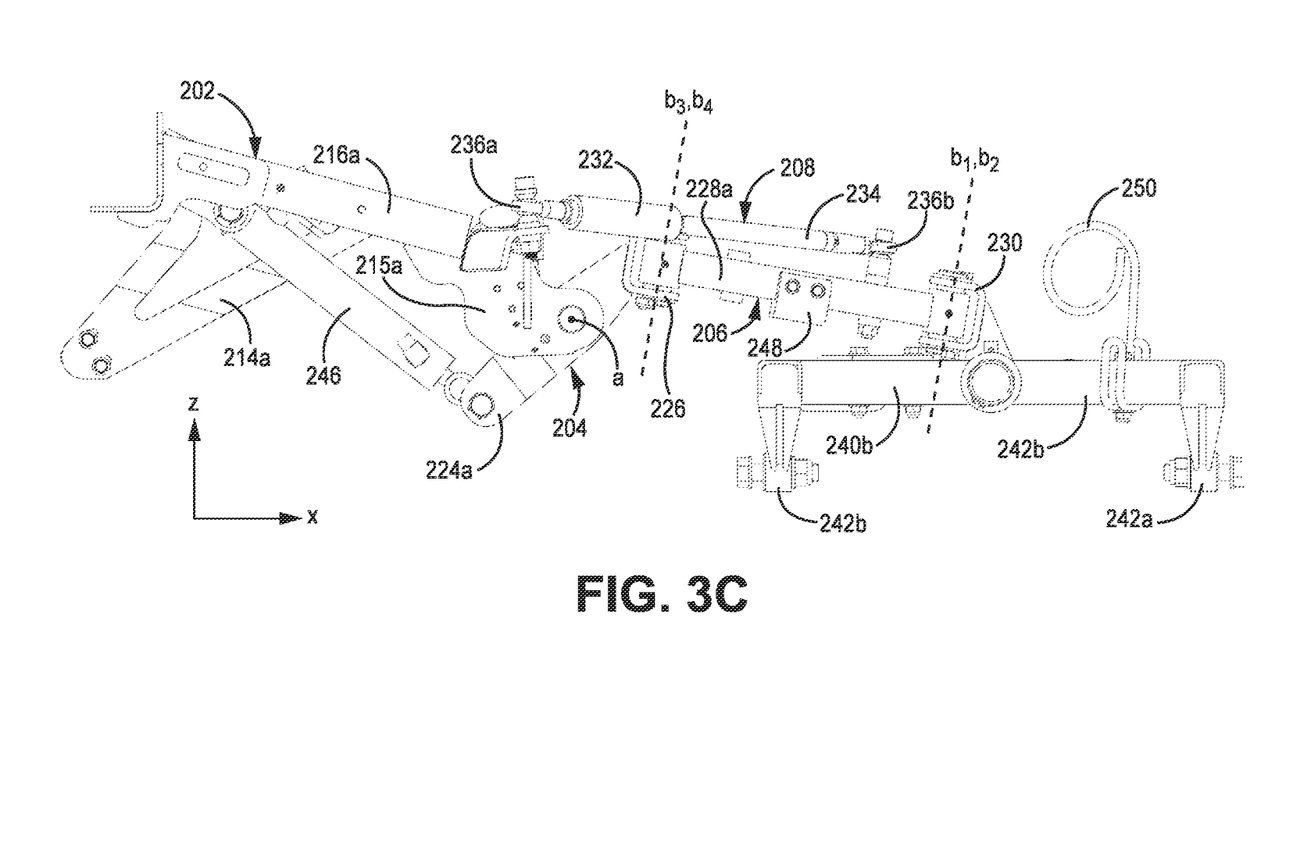
FIG. 3C is side view of the lifting unit in the lowered position according to some embodiments.
Figure 4A:
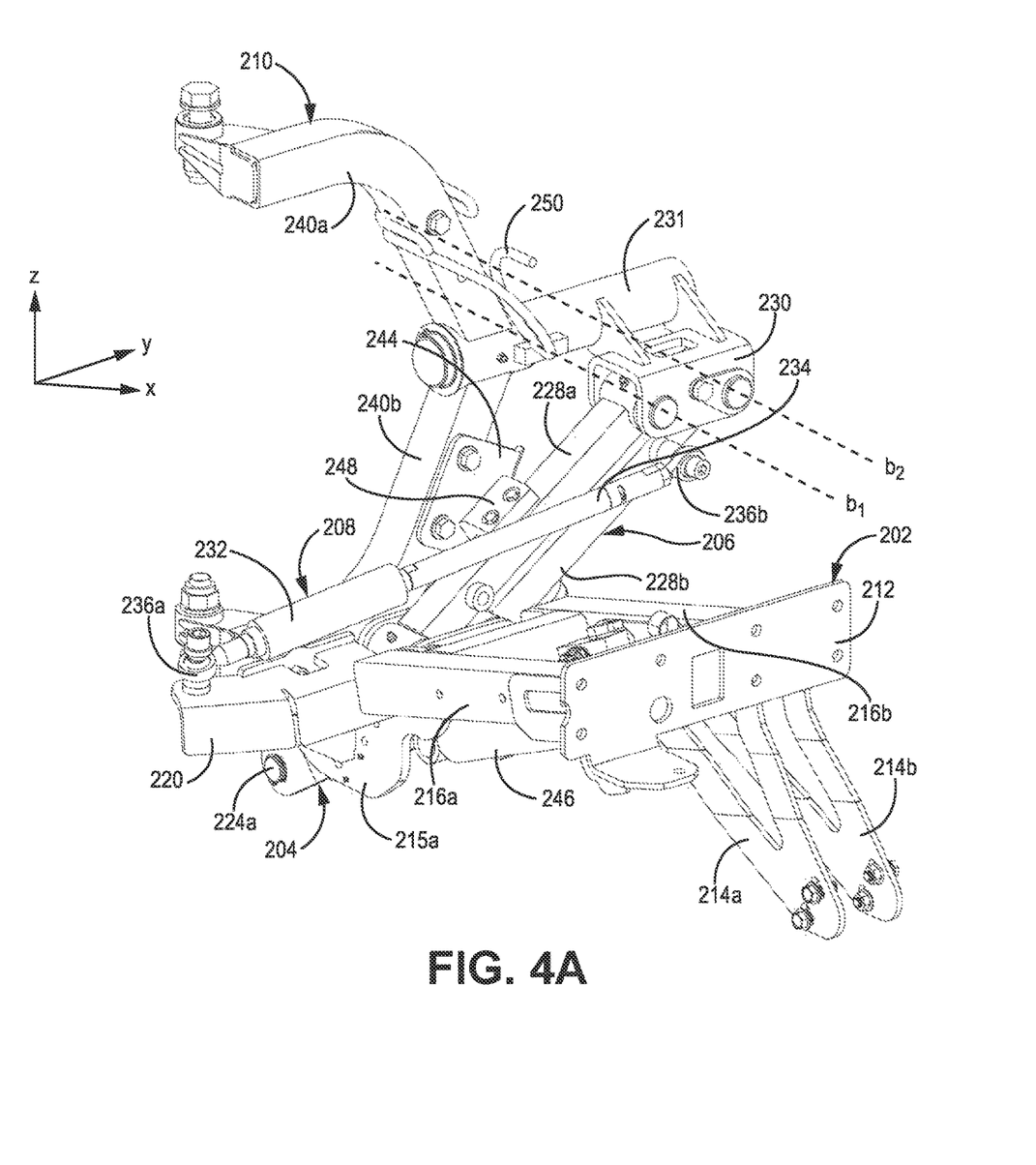
FIG. 4A is an orthogonal view of a lifting unit in a raised position.
Figure 4B:
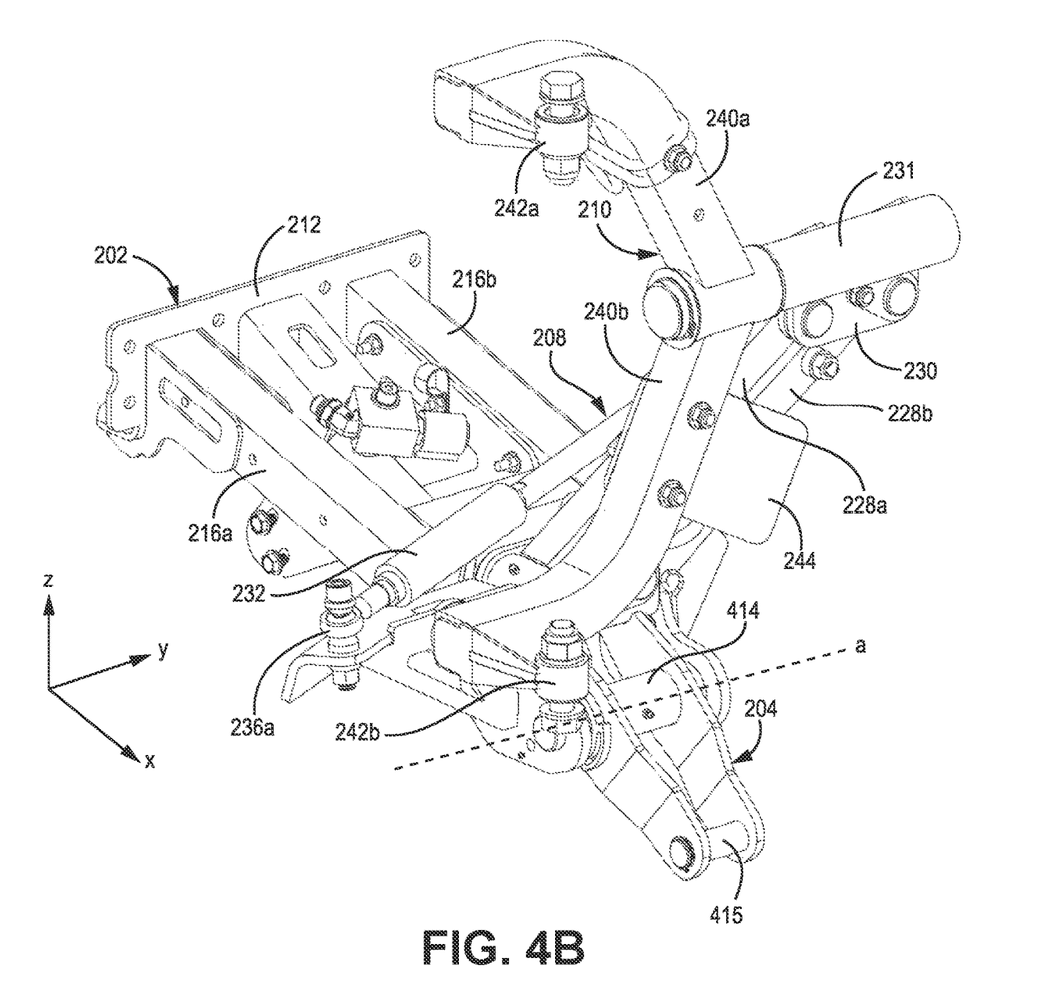
FIG. 4B is another orthogonal view of the lifting unit in the raised position.
Figure 4C:
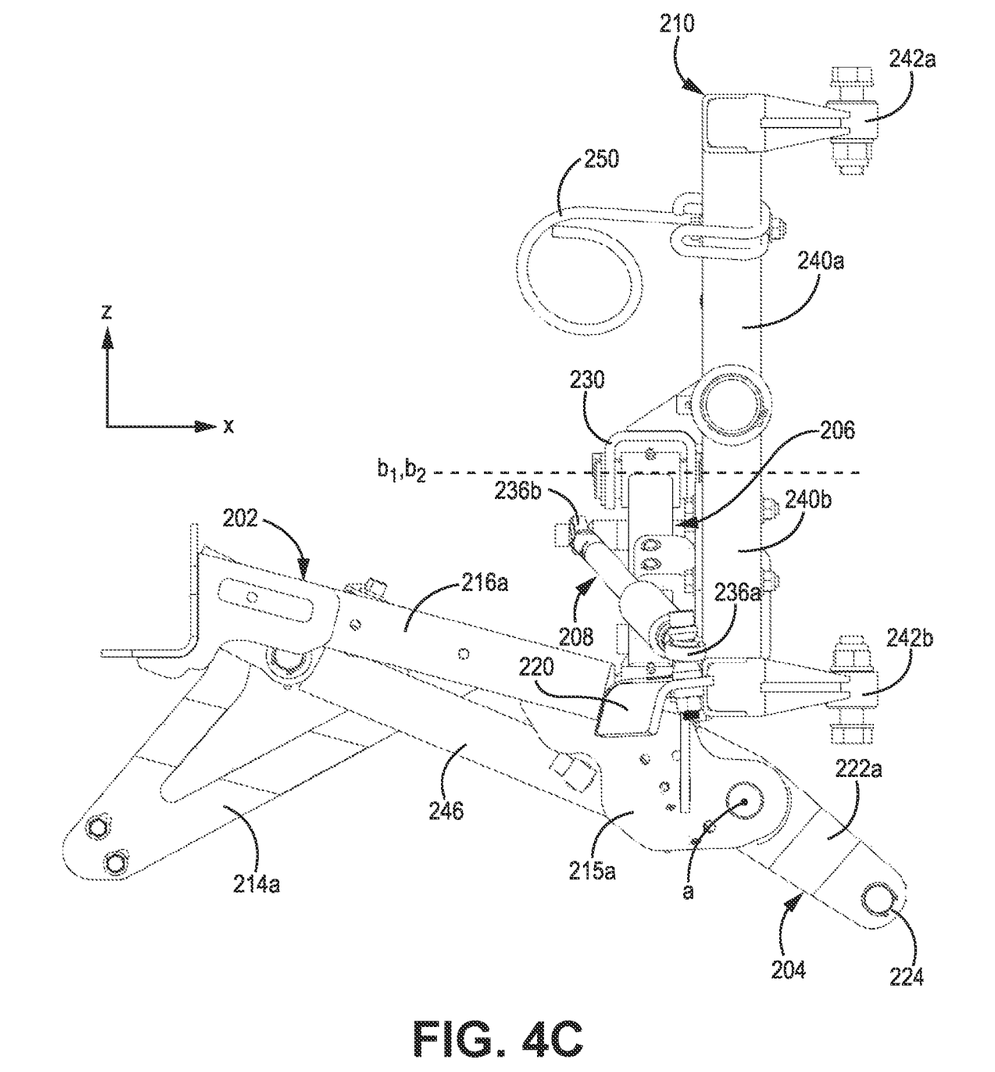
FIG. 4C is side view of the lifting unit in the raised position according to some embodiments.

Referring now to FIGS. 3A-3C and 4A-4C, a lifting unit 200 is shown in both the lowered position (FIGS. 3A-3C) and the raised/transport position (FIGS. 4A-4C). In particular, FIG. 3A is an orthogonal view of the lifting unit 200 that would be utilized on the right side of the gang-type lawn mower and FIG. 3B is an orthogonal view of the lifting unit 200 that would be utilized on the left side of the gang-type lawn mower. The lifting unit 200 utilized on the left side of the mower is substantially the same as the lifting unit 200 utilized on the right side, and the same numbers are utilized for components on each. In addition, FIG. 3C is a side view of the lifting unit 200 in the lowered position. FIGS. 4A-4C utilize the same views shown in FIGS. 3A-3C, but with the lifting unit in the second or raised position.

In some embodiments, the lifting unit 200 includes lifting frame assembly 202, first arm assembly 204, second arm assembly 206, third arm assembly 208, and yoke assembly 210. Lifting frame assembly 202 includes bracket 212, vertical support 214a, 214b, lifting frame arms 216a, 216b, frame cross member 217, and third arm frame support 220. Lifting frame geometry 202 is stationary and is connected between the frame of the vehicle (not shown) and the components utilized to lift the cutting deck. The components of lifting frame assembly 202 may be connected to one another via fasteners, weldments, or other well-known means of affixing components together. Referring to FIG. 2A, lifting frame assembly 202 is coupled to mower frame 218 via one or more fasteners and/or weldment. In particular, bracket 212 is utilized to secure the lifting frame assembly 202 to mower frame 218 and is located rearward of both the operator's seat 106 and the roll-over protection bar 108.

In some embodiments, first arm assembly 204 includes first and second arms 222a and 222b, which each include first ends 224a, 224b and second end 226, second arm assembly 206 includes first and second arms 228a. 228b, and third arm assembly 208 includes gas spring 232, arm 234, a first end 236a containing a first ball joint connection, and a second end 236b containing a second ball joint connection. Yoke assembly 210 includes mounting bracket 230, first and second arms 240a, 240b, connection ends 242a, 242b, strike plate 244.

In some embodiments, the first arm assembly 204 is pivotally affixed to the frame assembly 202. For example, pivot axis a shown in FIG. 3C illustrates the pivotally connection between the first arm assembly 204 and the frame assembly 202. In the embodiment shown in FIG. 3C, first and second brackets 215a, 215b are pivotally connected to first arm assembly 204, and in particular to first and second arms 222a and 222b of first arm assembly 204. The first ends 224a, 224b of first arm assembly 204 are pivotally connected to hydraulic cylinder 246 and the second end includes a pivotal mounting bracket 227 for pivotally connecting the first arm assembly 204 to the second arm assembly 206. To raise the yoke assembly 210 (and therefore the cutting deck) the hydraulic cylinder 246 is actuated or extended in length to pivot first arm assembly 204 about the pivot axis a. For example, FIG. 3C illustrates the hydraulic cylinder 246 in a non-actuated or non-extended state, in which yoke assembly 210 is in the lowered position. FIG. 4C illustrates the hydraulic cylinder 246 in the actuated or extended state, in which first arm assembly 204 is pivoted about the first axis a, causing the second arm assembly 208 and yoke assembly 210 to be raised vertically. In some embodiments, pivot axis a extends in an approximately longitudinal direction (e.g., y-direction or into the page in FIGS. 3C and 4C).

In some embodiments, the second arm assembly 206 includes one or more arms 228a, 228b pivotally connected to the first arm assembly 204 on one end and pivotally connected to the yoke assembly 210 on an opposite end. In the embodiment shown in FIGS. 3A-3C, first and second arms 228a and 228b are each pivotally connected to the pivotal mounting bracket 227 of first arm assembly 204, and pivot about axis $b_3$ and $b_4$. In some embodiments, first and second arms 228a and 228b are also pivotally connected to mounting bracket 230 associated with yoke assembly 210, and pivot about axis $b_1$ and $b_2$. As shown in FIG. 3C, the orientation of pivot axes $b_1$, $b_2$, $b_3$, and $b_4$ is non-parallel to that of axis a. As the cutting deck is raised/lowered, the orientation of pivot axis $b_1$, $b_2$, $b_3$, and $b_4$ is modified from an approximately vertical orientation (shown in FIG. 3C) to an approximately horizontal orientation (shown in FIG. 4C), but remains non-parallel to that of axis a. In some embodiments, the pivot axes $b_1$, $b_2$, $b_3$, and $b_4$ are approximately perpendicular to the axis a. The pivotal connection of the second arm assembly 206 to both the first arm assembly 204 and to the yoke assembly 210 allows the yoke assembly 210 to be moved in a longitudinal direction (e.g., along the y-axis) during vertical movement of the cutting deck. For example, as shown in FIG. 3B, when in the lowered position the first and second arms 228a and 228b extend outward from the first arm assembly 204 approximately perpendicular to the axis a. As shown in FIGS. 4A and 4B, when in the raised position the first and second arms 228a and 228b are allowed to pivot about axes $b_1$, $b_2$, $b_3$, and $b_4$ such that first and second arms 228a and 228b extend outward from first arm assembly 204 in a direction that is not perpendicular to the axis a. For example, in the embodiment shown in FIGS. 4A and 4B, first and second arms 228a and 228b of second arm assembly 206 extend rearwardly from the first arm assembly 204, resulting in the yoke assembly 210 moving in a rearward direction as compared with the location of the yoke assembly 210 in the lowered position.

The rearward movement of the yoke assembly 210 made possible by the pivotal connection of the second arm assembly 206 to the first arm assembly 204 and by the pivotal connection of the second arm assembly 206 to the yoke assembly 210 is controlled by the third assembly 208. As shown in FIGS. 3A-3C, the first third arm assembly 208 includes a first end 236a pivotally affixed to the frame assembly 202 and a second end 236b pivotally connected to the one of the arms (e.g., first arm 228a) of second arm assembly 206. In the embodiment shown in FIGS. 3A-3C and 4A-4C the third arm assembly 208 is connected to first arm 228a of the second arm assembly 206. In some embodiments, the length of third arm assembly 208 is constant (or relatively constant). As the first arm assembly 204 is actuated, causing the second arm assembly to move vertically upward, the third arm assembly causes the second arm assembly to pivot about axes $b_1$, $b_2$, $b_3$, and $b_4$. As a result, the distal end of second arm assembly 206 is caused to move rearward along the y-axis during the lifting operation.

The position of the third arm assembly 208 dictates the direction in which the yoke assembly (and cutting deck) is moved (e.g., forward, rearward) during lifting operations. In some embodiments, such as those shown in FIGS. 3A-3C and 4A-4C the third arm assembly is connected to the frame support 220 forward of the connection between first arm assembly 204 and second arm assembly 206. As a result of the placement of third arm assembly 208 relative to the first and second arm assemblies, the yoke assembly 210 and cutting deck is moved rearward as the cutting deck is lifted vertically upward. In other embodiments, the third arm assembly 208 may be connected to the frame support rearward of the connection between first arm assembly 204 and second arm assembly 206. In some embodiments, the distal end 236b of third arm assembly 208 is connected to the second arm assembly 206 more than halfway along the length of the second arm assembly (as shown in FIG. 3C, for example). In other embodiments, the distal end 236b of third arm assembly 208 may be connected to the second arm assembly 206 at various points along the length of the second arm assembly 206. The location at which the third arm assembly 208 is connected to the frame assembly 202 and to the second arm assembly 206 determines, in part, the length of forward/rearward travel of the yoke assembly 210 and cutting unit during lifting operations.

In some embodiments, first and second ends 236a and 236b of the third arm assembly 208 includes a ball joint connection to allow limited movement of the joint in a number of different directions. In other embodiments, other types of pivotal connections may be utilized to connect the third arm assembly 208 to the second arm assembly 206 and/or to the frame to allow the desired range of motion. In some embodiments, third arm assembly 208 further includes a gas spring 232 and an arm 234. The inclusion of gas spring 232 allows the cutting assembly to move in a lateral direction (approximately along the x-axis) in response to foreign objects (e.g., rocks) coming into contact with the cutting assembly while in the lowered position.

In some embodiments the yoke assembly 210 includes first and second arms 240a and 240b extending away from mounting tube 231. First and second arms 240a and 240b include connection ends 242a and 242b for rigidly connecting the yoke assembly 210 to the cutting unit. In some embodiments, yoke assembly 210 further includes a strike plate 244 affixed to one of the arms 240a or 240b. For example, in the embodiment shown in FIG. 3A the strike plate 244 includes a first portion extending approximately horizontally from the yoke assembly 210 and a second, bent portion. The bent portion is configured to come into contact with a contact plate 248 affixed to the second arm assembly 206 when the yoke assembly 210 is in the raised position. In some embodiments, the geometry of strike plate 244 acts to prevent the yoke assembly 210 from binding with second arm assembly 206 when in the raised position. The strike plate 244 acts to guide the yoke assembly 210 away from the second arm assembly. In some embodiments, yoke assembly 210 further includes a hose hangar 250 affixed to one of the first or second arms 240a, 240b.

Figure 5:
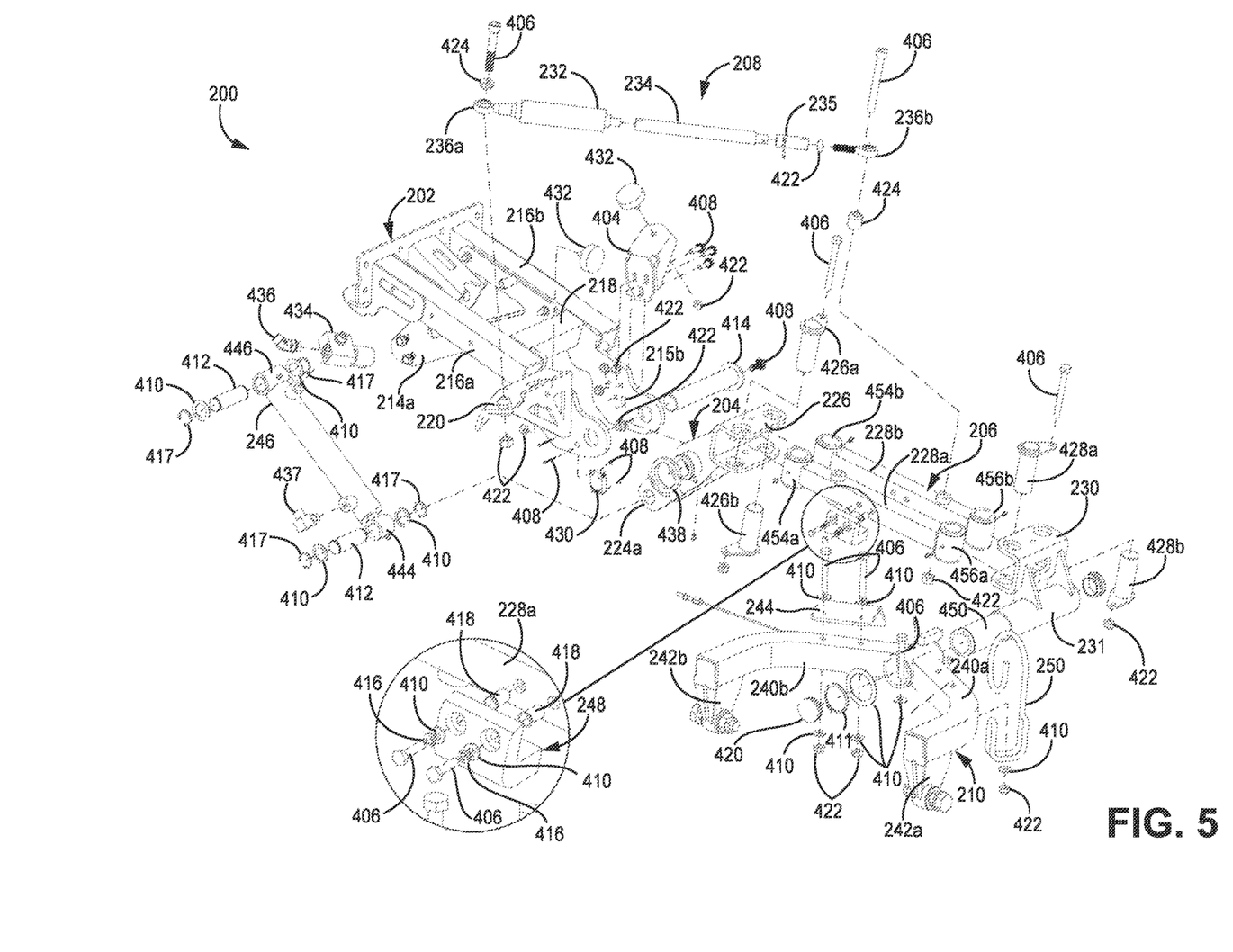
FIG. 5 is an exploded view of the lifting unit according to some embodiments.

Referring now to FIG. 5, an exploded view of the lifting unit 200 according to some embodiments is shown. In particular, FIG. 5 illustrates according to some embodiments the connection of the various components to one another. While particular structures are described for connecting the components to one another, it should be understood that various other means of connecting the components to one another may be utilized. For the sake of simplicity, a single numeric identifier is utilized for components of a same type (e.g., bolts, washers) all fasteners of this type, although it is understood that each component may vary in size/shape depending on the application.

In some embodiments, lifting frame assembly 202 includes bracket 212, vertical support 214a. 214b, first and second brackets 215a. 215b, lifting frame arms 216a, 216b, frame cross member 218, third arm frame support 220. The first arm assembly 204 is pivotally connected to the first and second brackets 215a, 215b of the lifting frame assembly 202. As shown in FIG. 5, a lift pin 414 is provided through an aperture in first bracket 215a, through apertures in the first arm assembly 204 (for example, in arms 222a, 222b of first arm assembly 204, as shown in FIGS. 3A and 4B, above), the aperture in second bracket 215b and secured by cam bracket 438 to allow first arm assembly 204 to pivot about lift pin 414. For example, pivot axis a would extend through lift pin 414.

In some embodiments, first arm assembly 204 is pivotally affixed to hydraulic cylinder 246 via locking pin 415. As shown in FIGS. 3A and 3C, first arm assembly 204 includes first and second arms 222a and 222b, each of which includes a first end 224 having apertures for receiving the locking pin 415. The distal end of hydraulic cylinder 246 includes an aperture 444 that is configured to fit within the first and second arms 222a and 222b such that the apertures of each are aligned, allowing locking pin 415 to be inserted through both the distal end 444 of the hydraulic cylinder 246 positioned between the first and second arms 222a, 222b of first arm assembly 204, and apertures in both are aligned to allow locking pin 415 to be secured in each. Washers 410 and locking washers 417 are utilized on each end of locking pin 415 to hold the locking pin in place and pivotally connect a distal end of the hydraulic cylinder to the first arm assembly 204. Actuation of hydraulic cylinder 246 exerts force on the first ends 224a. 224b of the first arm assembly 204. In some embodiments, a second end 446 of the hydraulic cylinder 246 is located opposite of the first end 444, and is secured via pin 412, washers 410 and lock washers 417 to the frame (not shown).

In some embodiments, first arm assembly 204 is coupled to second arm assembly 206 via first and second inner lift pins 426a. 426b. Second end 226 of first arm assembly 204 includes two pair of apertures (top and bottom) for receiving first and second inner lift pins 426. The first inner lift pin 426a extends through a top aperture associated with the first arm assembly 204, through an aperture associated with second arm 228a of second arm assembly 206, and through a bottom aperture associated with the first arm assembly 204, allowing arm 228a of second arm assembly 206 to pivot around first inner lift pin 426a. Likewise, the second inner lift pin 426b extends through a top aperture associated with the first arm assembly 204, through an aperture associated with second arm 228b of second arm assembly 206, and through a bottom aperture associated with the first arm assembly 204, allowing arm 228b of second arm assembly 206 to pivot around second inner lift pin 426b. In some embodiments, the inner lift pins 426a and 426b are secured to the second end 226 of first arm assembly 204 via a bolt that extends through an aperture in first inner lift pin 426a, apertures in the second end 226 of first arm assembly 204, and through an aperture in second inner lift pin 426b, secured by a nut 422.

In some embodiments, second arm assembly 206 is coupled to yoke assembly 210 via first and second outer lift pins 428a and 428b. Mounting bracket 230 of yoke assembly 210 includes two pair of apertures (top and bottom) for receiving first and second outer lift pins 428a and 428b. The first outer lift pin 428a extends through a top aperture associated with the mounting bracket 230, through an aperture 454a associated with second arm 228a of second arm assembly 206, and through a bottom aperture associated with the mounting bracket 230, allowing the arm 228a of second arm assembly 206 to pivot around first outer lift pin 428a. Likewise, the second outer lift pin 428b extends through a top aperture associated with the mounting bracket 230, through an aperture 454b associated with second arm 228b of second arm assembly 206, and through a bottom aperture associated with the mounting bracket 230, allowing arm 228b of second arm assembly 206 to pivot around second outer lift pin 428b. In some embodiments, the outer lift pins 428a and 428b are secured to the mounting bracket 230 of yoke assembly 210 via a bolt 406 that extends through an aperture in first outer lift pin 428a, apertures in the mounting bracket 230 of yoke assembly 210, and through an aperture in second outer lift pin 428b, secured by a nut 422.

In some embodiments, mounting bracket 230 is attached to mounting tube 231. In some embodiments, mounting bracket 230 is welded or otherwise affixed to mounting tube 231. In some embodiments, mounting tube 231 includes a first portion having a first radius and a second portion having a second radius smaller than the first radius. In some embodiments, the second portion 450 of mounting tube 231 has a radius configured to fit within the mounting tube 452 associated with first and second arms 240a and 240b of yoke assembly 210. In some embodiments, the second portion 450 extends through the mounting tube 452 and is captured by washer 410, ring 411 and plug 420. In some embodiments, ring 411 is a snap ring that is configured to snap into a groove associated with the second portion 450 of mounting tube 231, wherein a portion of snap ring 411 extends beyond the radius of the second portion 450 to capture the second portion 450 within the mounting tube 452.

In some embodiments, wire hose support 250 is secured via a fastener to first arm 240a of yoke assembly 210. In the embodiment shown in FIG. 5 the fastener includes bolt 406, a pair of washers 410 and a nut 422. In some embodiments, strike plate 244 is secured via a fastener to second arm 240b of yoke assembly 210. In the embodiment shown in FIG. 5 the fastener includes a pair of bolts 406, washers 410 and nuts 422. As described above, when the cutting deck is in the raised configuration the strike plate 244 comes into contact with the contact plate 248 connected to second arm assembly 206. A magnified view of the area identified as "A" is shown in the insert, which illustrates the connection of contact plate 248 with second arm 228b of second arm assembly 206. In some embodiments, two or more fasteners are utilized to secure the contact plate 248 with the second arm 228b of the second arm assembly 206. For example, in some embodiments, a pair of nutsets 418, washer 410, lock washers 417, and bolts 406 are utilized to secure the contact plate 248 to the second arm assembly 206. In some embodiments, contact plate 248 includes two counter sinks to ensure that the heads of bolts 406 do not interfere with the contact between contact plate 248 and strike plate 244.

In some embodiments, third arm assembly 208 is coupled to first arm 228a of second arm assembly 206 on one end and to the lifting frame assembly 202 on the opposite end. In some embodiments, third arm assembly 208 includes gas spring 232, arm 234, tie rod 235, first end 236a containing the first ball joint connection and a second end 236b containing the second ball joint connection, wherein third arm assembly 208 is pivotally fastened to second arm assembly 206 via the second ball joint. In the embodiment shown in FIG. 5, a bolt 406 and nut 422 are utilized to fasten first ball joint to the first arm 228a of second arm assembly 206, wherein a spacer 424 is utilized to maintain space between third arm assembly 208 and second arm assembly 206. In some embodiments, the spacer 424 allows third arm assembly 208 to pivot relative to second arm assembly 206 within contact between the respective arm assemblies. In some embodiments, third arm assembly 208 is further coupled to a stationary point associated with the lifting frame assembly 202. In some embodiments, mounting bracket 402 is affixed to lifting frame assembly 202 via one or more of weldments and/or fasteners, and third arm assembly 208 is pivotally fastened to the mounting bracket 402 via the first ball joint. In the embodiment shown in FIG. 5, a bolt 406 and nut 422 are utilized to fasten the second ball joint to the mounting bracket 402. In some embodiments a rubber stop 432 is affixed to mounting bracket 402, wherein the second arm 240b of the yoke assembly 210 comes into contact with the rubber stop 432 when the cutting deck is in the raised position.

In some embodiments, a stop bracket 404 is affixed to the lifting frame assembly 202. In some embodiments, stop bracket 404 may be welded and/or fastened to the lifting frame assembly 202. For example, in the embodiment shown in FIG. 5 the stop bracket 404 is fastened via a plurality of screws 408 to an outer surface of second bracket 215a associated with lifting frame assembly 202. In some embodiments, a rubber stop 432 is affixed or otherwise fastened to a surface of the stop bracket 404, wherein the rubber stop 432 comes into contact with the first arm 228a of the second arm assembly 206 when the cutting deck is in the raised position.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A lifting unit comprising
   a yoke assembly secured to a cutting deck;
   a first arm assembly having a first end and a second end, wherein the first arm assembly includes apertures configured to pivotally affix the first arm assembly to a stationary frame about a first pivot axis;
   a second arm assembly having a first end and a second end, wherein the first end is pivotably connected to the second end of the first arm assembly about a second pivot axis and wherein the second end is pivotally connected to the yoke assembly about a third pivot axis, wherein the second pivot axis and third pivot axis are non-parallel to the first pivot axis; and
   a third arm assembly having a first end configured to pivotally connect the third arm assembly to the stationary frame and a second end pivotally connected to the second arm assembly,
   wherein the first end of the third arm assembly is secured to the stationary frame at a location offset from the first end of the second arm in a longitudinally forward or rearward direction.

2. The lifting unit of claim 1, wherein the lifting unit includes a single hydraulic cylinder, wherein actuation of the single hydraulic cylinder moves the yoke assembly between a first, lower position and a second, raised position.

3. The lifting unit of claim 2, wherein the second arm assembly includes a first arm and a second arm, wherein each of the first arm and the second arm of the second arm assembly are pivotally connected to the first arm assembly at the first end of the second arm assembly and pivotally connected to the yoke assembly at the second end of the second arm assembly.

4. The lifting unit of claim 3, wherein the first arm and the second arm of the second arm assembly remain parallel to one another in both the lower position and the raised position.

5. The lifting unit of claim 3, wherein the first end of the third arm assembly is configured to connect to the stationary frame forward of the second arm assembly.

6. The lifting unit of claim 5, wherein the second end of the third arm assembly is pivotally connected to the second arm of the second arm assembly, wherein the second arm of the second arm assembly is located to the rear of the first arm of the second arm assembly.

7. The lifting unit of claim 1, wherein the second pivot axis and third pivot axis are approximately perpendicular to the first pivot axis.

8. The lifting unit of claim 2, wherein actuation of the single hydraulic cylinder moves the yoke assembly in a direction perpendicular to a longitudinal axis of the single hydraulic cylinder.

9. The lifting unit of claim 8, wherein the second arm assembly defines a second longitudinal axis and the third arm assembly defines a third longitudinal axis, wherein the second longitudinal axis intersects the third longitudinal axis at every yoke position between the first, lower position and the second, raised position.

10. The lifting unit of claim 1, wherein the cutting deck is movable from a first, lower position to a second, raised position, wherein the cutting deck is configured to mow in the first, lower position.

* * * * *